United States Patent
Kuhlmann et al.

(10) Patent No.: US 7,204,969 B2
(45) Date of Patent: Apr. 17, 2007

(54) HIGH-STRUCTURE PRECIPITATED SILICAS

(75) Inventors: Robert Kuhlmann, Erftstadt (DE); Karl Meier, Alfter (DE)

(73) Assignee: Degussa AG, Duesseldorf (DE)

( * ) Notice: Subject to any disclaimer, the term of this patent is extended or adjusted under 35 U.S.C. 154(b) by 868 days.

(21) Appl. No.: 09/991,640

(22) Filed: Nov. 26, 2001

(65) Prior Publication Data

US 2002/0102198 A1    Aug. 1, 2002

(30) Foreign Application Priority Data

Nov. 25, 2000   (DE) ................ 100 58 616

(51) Int. Cl.
    *C01B 33/12*    (2006.01)
(52) U.S. Cl. ..................... 423/335; 423/339
(58) Field of Classification Search ............... 423/335, 423/339; 502/232; 264/174.11; 424/724
    See application file for complete search history.

(56) References Cited

U.S. PATENT DOCUMENTS

| | | | |
|---|---|---|---|
| 3,480,390 A | | 11/1969 | Reinhardt et al. |
| 4,094,771 A | | 6/1978 | Brandt et al. |
| 4,289,681 A | * | 9/1981 | Nauroth et al. .............. 524/405 |
| 4,495,167 A | * | 1/1985 | Nauroth et al. .............. 423/339 |
| 4,664,907 A | * | 5/1987 | Muller et al. ................. 424/52 |
| 6,013,234 A | | 1/2000 | Ray et al. |
| 6,395,247 B1 | * | 5/2002 | Siray et al. ................. 423/335 |

FOREIGN PATENT DOCUMENTS

| EP | 0 078 909 | 5/1983 |
|---|---|---|
| EP | 0 745 558 | 12/1996 |
| EP | 0 901 986 | 3/1999 |

* cited by examiner

*Primary Examiner*—Edward M. Johnson
(74) *Attorney, Agent, or Firm*—Oblon, Spivak, McClelland, Maier & Neustadt, P.C.

(57) ABSTRACT

A precipitated silica having the following physico-chemical characteristics:

| | | |
|---|---|---|
| pH (5% in water) (ISO 787-9) | | 3–8 |
| BET surface area (DIN 66131) | $(m^2/g)$ | 400–600 |
| DBP absorption value (DIN 53601, in relation to dried substance) | (g/100 g) | 380–420 |
| Tapped density (ISO 787-11) | (g/l) | 100–200 |
| ALPINE sieve residue > 63µ (ISO 8130-1) | (%) | 0.1–40. |

19 Claims, No Drawings

HIGH-STRUCTURE PRECIPITATED SILICAS

BACKGROUND OF THE INVENTION

1. Field of the Invention

The present invention relates to precipitated silicas having a high structure, to a process for the manufacture of the silicas and to the use of these silicas.

2. Description of the Background

The structure of a silica is understood to be the extent to which its primary particles congregate into secondary particles or, respectively, tertiary particles. The unit used to express the size of the structure is the Brabender dibutyl phthalate (DBP) absorption coefficient.

Spray dried precipitated silicas are known and sold, for instance, under the brand name of Sipernat®. The silicas are usually manufactured by precipitating water glass with sulfuric acid, wherein the entire width of possible precipitation variants can be deployed, as described, for example in EP 0 078 909, U.S. Pat. No. 4,094,771 or U.S. Pat. No. 6,013,234.

After precipitation the solid matter is removed by filtration and the filter cake is then spray-dried. If necessary, it is re-dispersed by adding an acid. Spray drying allows the manufacture of almost spherical, solid particles with a narrow size distribution range.

Silicas with DBP absorption values of up to 380 g/100 g are known as described in EP 0 078 909. In Example 1 of EP 0 078 909, a silica with 380 g/100 g DBP absorption value is obtained by spray-drying a silica suspension containing 11% solids by weight. According to Example 5 of EP 0 078 909 a DBP absorption of 346 g/100 g is obtained by spray-drying a silica suspension containing 16% solid matter by weight.

A similar process is disclosed in U.S. Pat. No. 6,013,234. In this case a silica suspension with pH>4 and a solids content of more than 18% by weight was spray-dried to form particles with an average particle diameter of more than 150 µm and a BET surface area of 100 to 350 $m^2/g$.

The known spray dried precipitated silicas can be improved with respect to their DBP absorption values.

SUMMARY OF THE INVENTION

Accordingly, one object of the present invention is to provide silicas of improved physical characteristics.

Briefly, this object and other objects of the present invention as hereinafter will become more readily apparent can be attained by precipitated silicas having the following physico-chemical data:

| | | |
|---|---|---|
| pH (5% in water) (ISO 787-9) | | 3–8 |
| BET surface area (DIN 66131) | $(m^2/g)$ | 400–600 |
| DBP absorption value (DIN 53601, in relation to dried substance) | (g/100 g) | 380–420 |
| Tapped density (ISO 787-11) | (g/l) | 100–200 |
| ALPINE sieve residue > 63µ (ISO 8130-1) | (%) | 0.1–40 |

DETAILED DESCRIPTION OF THE PREFERRED EMBODIMENTS

Surprisingly, it has now been discovered that high-structured spray-dried silicas with DBP absorption values of more than 380 g/100 g can be obtained by employing a specific precipitation method.

Precipitated silicas of variant I of the present invention have the following physico-chemical characteristics.

| Variant | II | III | IV |
|---|---|---|---|
| pH (5% in water) (ISO 787-9) | 3–8 | 3–8 | 3–8 |
| BET surface area (DIN 66131) $(m^2/g)$ | 400–600 | 400–600 | 400–600 |
| DBP absorption value (DIN 53601, in relation to dried substance) (g/100 g) | 380–420 | 380–420 | 380–420 |
| Tapped density (ISO 787-11) (g/l) | 140–200 | 120–180 | 100–130 |
| ALPINE sieve residue > 63µ (ISO 8130-1) (%) | 10–40 | 1–10 | 0.1–1 |

Another variant of the precipitated silicas of the present invention have the following physico-chemical characteristics:

| Variant | I | II | III | IV |
|---|---|---|---|---|
| pH (5% in water) (ISO 787-9) | 3–8 | 3–8 | 3–8 | 3–8 |
| BET surface area (DIN 66131) $(m^2/g)$ | 400–600 | 400–600 | 400–600 | 400–600 |
| DBP absorption value (DIN 53601, in relation to dried substance) (g/100 g) | 380–420 | 380–420 | 380–420 | 380–420 |
| Tapped density (ISO 787-11) (g/l) | 100–200 | 140–200 | 120–180 | 100–130 |
| ALPINE sieve residue > 63µ (ISO 8130-1) (%) | 0.1–40 | 10–40 | 1–10 | 0.1–1 |

The variants of silica of the present invention can be prepared by a process in which, while stirring water in a vessel with a force sufficient to subject the medium to shear while the water is heated to 35° C. to 45° C., water and sulfuric acid are added together to the medium within at least 100 minutes. The pH is maintained at 6–7. The introduction of substances into the vessel is then interrupted for 60–120 minutes and when the addition of the substances has been completed, the medium contains a solids content of 36–42 g/l. The solids are removed by filtration, the filter cake is washed and the solid material is subjected to a short retention drying process A special variant of the process is such that while stirring a vessel containing water heated to 35° C. to 45° C., preferably 36° C. to 40° C. and maintaining a pH of 6–7 and waterglass and sulfuric acid together, while the mixture is subjected to shear during the entire precipitation time with a disk agitator installed in addition to the agitator, by interrupting the precipitation for 90 minutes from the $13^{th}$ to the $103^{rd}$ minute, after a total precipitation time of 137 minutes, a final silica concentration of 38 to 42 g/l is established in the precipitation suspension. The precipitation suspension is then filtered and washed, the filter cake is dried or liquefied by adding water and/or acid to form a suspension containing 8% to 16% solid matter. The suspension is then spray-dried.

The short retention time drying in process stage c) can be conducted by liquefying the filter cake to a solids content of less than 18% by weight and spray-drying the suspension.

In another variant of the process of the present invention the short retention time drying process can be conducted by means of a spin-flash drying process on the washed filter cake from process stage b).

The pH of the end product is of decisive importance for many applications of the silicas. For instance, if the silica is used as a carrier material for vitamins, a neutral or weak acidic pH is required. The pH can be modified by subsequently treating the spray-dried silica with a base such as ammonia gas or by adjusting the pH of the re-suspended filter cake.

Determination of the pH of the silica is conducted on a 5% suspension of spray-dried silica according to the procedure of ISO 787-9.

The process of the present invention can be conducted under the condition that either the pH of the precipitation suspension is not modified after precipitation or the pH is lowered to 2–5, preferably 3, by adding acid, e.g. sulfuric acid.

The solid matter is separated from the suspension by known filtration methods such as a filter press (diaphragm filter press). The filter cake obtained in this way can be dried, for example by using a spin flash dryer. It is also possible to liquefy the filter cake by adding water and/or acid. If acid is employed, e.g. diluted sulfuric acid, a pH of <5, preferably 2–4, is adjusted in the suspension.

In a special embodiment of the process of the present invention, the product that has been subjected to a short retention drying process is subsequently treated with ammonia gas, or, alternatively, the drying process is conducted in the presence of ammonia gas.

Adding ammonia gas increases the pH of the silica and enables higher DBP absorption values.

A specified particle size distribution can be adjusted with the aid of a spray dryer or a jet dryer (jet tower). This can be adjusted by selecting the dryer type (single material jet, 2 material jet, gas/liquid jet, atomizing disk) and the spraying pressure. Typically a dryer with an atomizing disk is used.

Silicas of the present invention can be used as a carrier for converting liquids into powder form, e.g. in the crop protection, pesticide and animal feed industries, e.g. vitamin A and E, choline chloride, as a free-flow or anti-caking agent, for example for table salt or instant meals, as well as in elastomers such as tires.

The silicas according to the present invention can be used to manufacture catalyst carriers.

Having now generally described this invention, a further understanding can be obtained by reference to certain specific examples which are provided herein for purposes of illustration only and are not intended to be limiting unless otherwise specified.

EXAMPLES

Reference Example 1

Precipitation of silica material is conducted as described in Example 1 of EP 0 078 909. For this purpose 60 m$^3$ of water at a temperature of 40° C. was added to a precipitation vessel, fitted with an EKATO MIG agitator and an additional EKATO shearing turbine. Commercially available water glass (26.8% SiO$_2$; 8.0% Na$_2$O; density 1.346) and sulfuric acid (96%) flow into this vessel simultaneously at a speed of 10 m$^3$/h and 0.9 m$^3$/h respectively. After the 13$^{th}$ minute of precipitation the addition of water glass and acid is interrupted for 90 minutes. During this time both stirring devices continue to operate. From the 103$^{rd}$ minute the water glass and acid are added once more, at the above-mentioned rates, until the 146$^{th}$ minute. The solids content of the precipitation suspension is 47 g/l.

The solid of the suspension is removed by filtration in filter presses, washed and the resulting filter cake is liquefied under the effects of shearing. The solids content is 11.0%, the pH is 5. The silica suspension is then spray-dried. A DBP absorption value of 355 g/100 g was determined for the product that was obtained in the above manner.

The characteristics of the non-comminuted product are shown in the table below.

Reference Example 2

A precipitated silica was manufactured by the procedure described in Example 5 of EP 0 078 909. The procedure only differs from that of Reference Example 1 in the manufacture of the silica suspension for spray-drying. The filter cake is adjusted to a solids content of 16% by weight and a pH of 4.5 by adding water and acid under shearing conditions. The DBP absorption value is 349 g/100 g.

The characteristics of the non-comminuted product are found in the table below.

Example 1

An amount of 60 m$^3$ of water at a temperature of 38° C. was added to a precipitation vessel, fitted with an EKATO MIG agitator and an additional EKATO disk agitator (350 mm diameter). While maintaining a pH of 6.5, commercially available water glass (27.1% SiO$_2$; 8.07% Na$_2$O; density 1.355) and sulfuric acid (96%) flow into this vessel simultaneously at a speed of 10 m$^3$/h and 0.9 m$^3$/h respectively. The acid is made to flow over the disk agitator, which is started when precipitation begins. After 13 minutes precipitation time, the addition of water glass and acid is interrupted for 90 minutes. During this time both the agitator and the EKATO disk agitator continue to operate. After this time the water glass and acid are added once more, at the above-mentioned rates and maintaining the above-mentioned pH for a further 34 minutes. The suspension is then acidified to pH 3 by adding sulfuric acid. The solids content of the precipitation suspension is 40 g/l. The suspension is subsequently filtered and washed in filter presses. For the further processing stage the filter cake is liquefied under shear with the addition of water and small quantities of sulfuric acid. The pH is 5.0; the solids content is 12%. The silica suspension is then spray-dried. The free sulfuric acid in the material is neutralized downstream of the spray dryer with ammonia gas.

The characteristics of the non-comminuted product are found in the table below.

Example 2

A precipitated silica is manufactured as described above in Example 1, except that the filter cake obtained after processing in the diaphragm filter press is liquefied under shear with the addition of water and small quantities of sulfuric acid. The pH is 5.0 and the solids content is 11.0%. The silica suspension is then spray-dried.

Example 3

The precipitated silica is manufactured by the procedure of Example 1 above, except that the filter cake obtained after processing in the diaphragm filter press is liquefied upon the addition of water. The solids content is 8%.

The characteristics of the non-comminuted product are described in the table below.

Example 4

The precipitated silica is manufactured according to the procedure of Example 1 above, except that the filter cake obtained after processing in diaphragm filter presses with a solids content of 18% is dried for further processing in a spin flash dryer. (O. T. Kragh, Keramische Zeitschrift, Vol. 30, issue 7, pp 369–370, 1978; T. Hoepffner, Informations Chemie, Vol. 342, pp 141–145, 1992).

The characteristics of the non-comminuted product are shown in the table below.

Example 5

The precipitated silica is manufactured according to the procedure of Example 1 described above, except that the precipitation suspension is not acidified after precipitation is complete. The suspension is filtered in diaphragm filter presses and washed with highly diluted sulfuric acid with a pH of 1.6 to 1.8. For further processing the filter cake with a solids content of 18% is dried in a spin flash dryer. The free sulfuric acid contained in the material from the washing process is neutralized by adding ammonia, or, alternatively, the pH in the powder is raised to 7.7.

The characteristics of the non-comminuted product are shown in the table below.

Example 6

Manufacture of a precipitated silica and the subsequent processing of the suspension, including washing were conducted according to the procedure described in Example 4 above, except that for further processing the filter cake is liquefied by adding water under shear conditions. The pH is 3.2; the solids content is 11%. To neutralize the free sulfuric acid, the material is neutralized with ammonia gas downstream of the spray-dryer.

The characteristics of the non-comminuted product are shown in the table below.

The disclosure of German priority Application No. 10058616.3 dated Nov. 25, 2000 is hereby incorporated by reference into the present application.

Obviously, numerous modifications and variations of the present invention are possible in light of the above teachings. It is, therefore, to be understood that within the scope of the appended claims, the invention may be practiced otherwise than as specifically described herein.

What is claimed as new and is intended to be secured by Letters Patent is:

1. A precipitated silica having the following physico-chemical characteristics:

| | | |
|---|---|---|
| pH (5% in water) (ISO 787-9) | | 3–8 |
| BET surface area (DIN 66131) | $(m^2/g)$ | 400–600 |
| DBP absorption value (DIN 53601, in relation to dried substance) | (g/100 g) | 382–420 |
| Tapped density (ISO 787-11) | (g/l) | 100–200 |
| ALPINE sieve residue > 63µ (ISO 8130-1) | (%) | 0.1–40. |

2. The precipitated silica according to claim 1, which has the following physico-chemical characteristics:

| | | |
|---|---|---|
| pH (5% in water) (ISO 787-9) | | 3–8 |
| BET surface area (DIN 66131) | $(m^2/g)$ | 400–600 |
| DBP absorption value (DIN 53601, in relation to dried substance) | (g/100 g) | 382–420 |
| Tapped density (ISO 787-11) | (g/l) | 140–200 |
| ALPINE sieve residue > 63µ (ISO 8130-1) | (%) | 10–40. |

3. The precipitated silica according to claim 1, which has the following physico-chemical characteristics:

| | | |
|---|---|---|
| pH (5% in water) (ISO 787-9) | | 3–8 |
| BET surface area (DIN 66131) | $(m^2/g)$ | 400–600 |
| DBP absorption value (DIN 53601, in relation to dried substance) | (g/100 g) | 382–420 |
| Tapped density (ISO 787-11) | (g/l) | 140–180 |
| ALPINE sieve residue > 63µ (ISO 8130-1) | (%) | 1–10. |

TABLE

| | | Reference Examples | | Examples | | | | | | | | | |
|---|---|---|---|---|---|---|---|---|---|---|---|---|---|
| | | 1 | 2 | 1 | 2 | 3 | 4 | 5 | | | | | 6 |
| pH | | 6.4 | 6.2 | 7.6 | 6.7 | 6.7 | 6.4 | 3.1 | 4.7 | 6.3 | 7.0 | 7.7 | 6.3 |
| DBP absorption value | g/100 g | 355 | 349 | 389 | 382 | 400 | 387 | 383 | 391 | 398 | 406 | 412 | 387 |
| Tapped density | g/l | 180 | 182 | 154 | 154 | 135 | 120 | 119 | 115 | 111 | 108 | 111 | 164 |
| ALPINE SR > 63 µm | % | 10 | 23 | 15 | 1.4 | 1.8 | 0.3 | 0.2 | 0.3 | 0.3 | 0.2 | 0.1 | 18 |
| BET surface area | $m^2/g$ | 429 | 515 | 454 | 458 | 485 | 484 | 501 | | | | 476 | 495 |
| Suspension | pH | ~6 | | | ~3 | | | | ~7 | | | | |
| Washing process | | normal | | | normal | | | | acidic | | | | |
| Suspension of filter cake | pH | 5 | 4.5 | 5 | 5 | 5 | N/A | N/A | (Filter cake has pH~3) | | | | 3.2 |
| Solids content | % | 11 | 16 | 12 | 11 | 8 | 18 | | | 18 | | | | 11 |
| NH₃ addition | | — | — | + | — | — | — | — | + | + | + | + | + | + |
| Dryer | | SP | SP | SP | SP | SP | SF | SF | SF | SF | SF | SF | SF | SP |

*SF = Spin flash dryer
SP = Spray dryer

4. The precipitated silica according to claim 1, which has the following physico-chemical characteristics:

| | | |
|---|---|---|
| pH (5% in water) (ISO 787-9) | | 3–8 |
| BET surface area (DIN 66131) | (m²/g) | 400–600 |
| DBP absorption value (DIN 53601, in relation to dried substance) | (g/100 g) | 382–420 |
| Tapped density (ISO 787-11) | (g/l) | 100–130 |
| ALPINE sieve residue > 63μ (ISO 8130-1) | (%) | 0.1–1. |

5. A process for manufacturing a precipitated silica, which comprises:
    while stirring water in a vessel with a force sufficient to subject the medium to shear containing water heated to 35° C. to 45° C.,
    a) adding water and sulfuric acid together within at least 100 minutes, to the vessel and maintaining a pH of 6–7, wherein the addition of substances is interrupted for 60 to 120 minutes and when the addition of the substances to the vessel has been completed, a solids content of 36 to 42 g/l remains; and
    b) filtering the solid matter, washing the filter cake and subjecting the solid material to a short retention drying process,
    wherein the precipitated silica has the following physico-chemical characteristics:

| | | |
|---|---|---|
| pH (5% in water) (ISO 787-9) | | 3–8 |
| BET surface area (DIN 66131) | (m²/g) | 400–600 |
| DBP absorption value (DIN 53601, in relation to dried substance) | (g/100 g) | 380–420 |
| Tapped density (ISO 787-11) | (g/l) | 100–200 |
| ALPINE sieve residue >63μ (ISO 8130-1) | (%) | 0.1–40. |

6. The process according to claim 5, which further comprises conducting a short retention time drying process (c) by liquefying the filter cake to a solids content of less than 18% by weight and spray-drying the resulting suspension.

7. The process according to claim 6, wherein the short retention time drying process in (c) is conducted by drying the filter cake with a spin flash dryer.

8. The process according to claim 6, wherein the silica obtained after the short retention drying process is adjusted to pH 7 to 8 with ammonia gas.

9. The process according to claim 6, wherein the filter cake is washed with diluted sulfuric acid.

10. A method of formulating an animal feed, comprising:
    combining nutritive feed components of the animal feed with the precipitated silica of claim 1 as a carrier.

11. A method of formulating a vitamin formulation, comprising:
    combining vitamin components of the vitamin formulation with the precipitated silica of claim 1 as a carrier.

12. A method of formulating a catalyst, comprising:
    combining components of the catalyst with the precipitated silica of claim 1 as a carrier for catalytically active components of the catalyst.

13. A method of formulating a free-flowing composition, comprising:
    formulating ingredients of the composition with the precipitated silica of claim 1 which functions as a free-flow or anti-caking agent.

14. A method of converting a liquid into powder form, comprising:
    combining said liquid with the precipitated silica of claim 1 as an auxiliary thereby converting the liquid into powder.

15. The powder prepared by the method of claim 14.

16. An elastomer containing mixture prepared by combining an elastomer with the precipitated silica of claim 1.

17. A method of manufacturing a catalyst carrier, comprising:
    combining components of the catalyst carrier with the precipitated silica according to claim 1.

18. The precipitated silica according to claim 1, wherein the DBP absorption value (DIN 53601, in relation to dried substance) is at least 383 g/100 g.

19. The precipitated silica according to claim 1, wherein the DBP absorption value (DIN 53601, in relation to dried substance) is at least 387 g/100 g.

* * * * *